United States Patent
Robert et al.

(10) Patent No.: US 10,527,837 B2
(45) Date of Patent: Jan. 7, 2020

(54) IMAGING METHOD, AND SYSTEM, FOR OBTAINING A SUPER-RESOLUTION IMAGE OF AN OBJECT

(71) Applicants: Commissariat à l'énergie atomique et aux énergies alternatives, Paris (FR); Centre national de la recherche scientifique, Paris (FR)

(72) Inventors: Bruno Robert, Paris (FR); Andrew Gall, Montrouge (FR); Dmitrij Frolov, Paris (FR); Rienk Van Grondelle, Haarlem (NL)

(73) Assignees: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 207 days.

(21) Appl. No.: 15/539,457

(22) PCT Filed: Dec. 23, 2015

(86) PCT No.: PCT/EP2015/081220
§ 371 (c)(1),
(2) Date: Jun. 23, 2017

(87) PCT Pub. No.: WO2016/102700
PCT Pub. Date: Jun. 30, 2016

(65) Prior Publication Data
US 2017/0351080 A1   Dec. 7, 2017

(30) Foreign Application Priority Data
Dec. 23, 2014 (EP) ..................................... 14307179

(51) Int. Cl.
  *G02B 21/36* (2006.01)
  *G02B 21/00* (2006.01)
(52) U.S. Cl.
  CPC ......... *G02B 21/365* (2013.01); *G02B 21/008* (2013.01); *G02B 21/0072* (2013.01); *G02B 21/0076* (2013.01); *G02B 21/0036* (2013.01)
(58) Field of Classification Search
  None
  See application file for complete search history.

(56) References Cited

U.S. PATENT DOCUMENTS

| 6,180,415 B1 * | 1/2001 | Schultz | B82Y 30/00 356/301 |
| 2012/0270460 A1 * | 10/2012 | Miyazawa | H01L 51/56 445/2 |
| 2013/0188250 A1 | 7/2013 | Yokoi | |
| 2017/0322406 A1 | 11/2017 | Sirat | |

FOREIGN PATENT DOCUMENTS

| CN | 102928384 A | 2/2013 |
| CN | 103473751 A | 12/2013 |
| CN | 104122662 A | 10/2014 |

OTHER PUBLICATIONS

Sheppard, C J R., "Super-resolution in confocal imaging", Optik—International Journal for Light and Electron Optics, vol. 80, No. 2, Jan. 1, 1988, pp. 53-54, XP055196207.
(Continued)

*Primary Examiner* — Samira Monshi
(74) *Attorney, Agent, or Firm* — B. Aaron Schulman, Esq.; Stites & Harbison, PLLC (57) ABSTRACT

Method for obtaining an super-resolution image (22) of an object (5), based upon an optical microscope (21) including a support plate (6) for bearing the object, an illumination source (1) for focusing an illumination beam (14) onto a target region of the support plate, a digital camera (9) including a matrix of sensors, comprising: capturing, by the
(Continued)

digital camera, a first image of the target region; extracting, from the first image, a first block of pixel values provided by a sub-matrix ($B_0$) of the matrix of sensors; displacing, by a sub-diffraction limited distance, the support plate by the displacement block along a displacement axis; capturing, by the digital camera, a second image of the target region; extracting, from the second image, a second block of pixel values provided by the sub-matrix ($B_0$) of the matrix of sensors; storing said first and second blocks of pixel values as a first and second blocks of pixel values to be placed right next each other in the super-resolution image along the image axis (X, Y) corresponding to the displacement axis.

12 Claims, 8 Drawing Sheets (56) References Cited

OTHER PUBLICATIONS

Muller, et al., "Image Scanning Microscopy", Physical Review Letters, vol. 104, No. 19, May 1, 2010, XP055153448.

Nakamura, et al, "A two-photon scanning fluorescence microscope with deep UV excitation and Near UV Detection", Optik, Wissenschaftliche Verlag Gmbh, DE, vol. 100, No. 4, Oct. 1, 1995, p. 167-170, XP000530199.

Kristen, et al, "High-Content Screening Assay for Activators of the Wnt/Fzd Pathway in Primary Human Cells", Assay and Drug Development Technologies, vol. 3, No. 2, Apr. 1, 2005, pp. 133-141, XP055013120.

International Search Report dated Mar. 16, 2016 in International Application No. PCT/EP2015/081220.

\* cited by examiner

IMAGING METHOD, AND SYSTEM, FOR OBTAINING A SUPER-RESOLUTION IMAGE OF AN OBJECT

The present invention generally relates to the field of the production of magnified images of small objects using optical microscopes.

More specifically the invention relates to an imaging method for obtaining an super-resolution image of an object, based upon an optical microscope adapted for capturing a image of the object, said optical microscope including:
a support plate for bearing the object,
an illumination source adapted to produce an illumination beam for illuminating the object,
an optical element for focusing the illumination beam on the support plate, the section of the object on the support plane currently illuminated by the focused illumination beam being called hereafter the target region,
a digital camera including a matrix of sensors for capturing an image of the target region, each sensor providing for a respective pixel value and
a displacement block for displacing the support plate relative to the focused illumination beam and to the digital camera along at least two displacement axes among three axes x, y, z perpendicular to each other, wherein the axes x and y define the plane of the support plate, said at least two displacement axes defining two corresponding perpendicular image axes of the super-resolution image.

The resolution of an optical microscope relates to the ability of the microscope to reveal adjacent details as distinct and separate. Independently of imperfections of lenses, the optical microscope's resolution is limited by light's diffraction.

Indeed, because of light's diffraction, the image of a point is not a point, but appears as a fuzzy disk surrounded by a diffraction, called "Airy disk" or "point spread function". Thus two points of the object, adjacent but distinct, will have for image points two spots whose overlapping can prevent from distinguishing the two image points: the details are then not resolved.

According to the Abbe diffraction limit, the limit of resolving separate points by the optical microscope, known as the diffraction limit, is stated as $$0.51 \cdot \left(\frac{\lambda}{NA}\right),$$

where $\lambda$ is the wavelength of the illumination source, and NA is the numerical aperture of the objective lens of the optical microscope. In general, the lowest value of the diffraction limit obtainable with conventional objective lens is approximately 150 nanometers (nm) for visible wavelength region.

There are known processes for producing images with higher resolution than the resolution allowed by simple use of diffraction-limited optics: for example, the Stimulated Emission Depletion microscopy (STED), the Spatially Structured Illumination Microscopy (SSIM), Photoactivated Localization microscopy (PALM), the Stochastic Optical Reconstruction Microscopy (STORM).

Documents relative to such techniques are for example WO 2013/153294 A1, or "Fluorescence microscopy with diffraction resolution barrier broken by stimulated emission", Klar et al., Proc Natl Acad Sci USA. 2000 97,8206-8210.

A common thread in these techniques is that they are able to resolve details beyond the diffraction limit, for example in PALM this is achieved by switching fluorophores on and off sequentially in time, so that the signals can be recorded consecutively.

Unfortunately, these super-resolution methods require purchasing expensive optical platforms (e.g. more than 1 M € for STED) and/or require further significant post signal data treatment, both being beyond the resources of most cellular biology laboratories.

The current state of the art of image scanning microscopy (ISM) can be embodied in the summation of the following publications:
Sheppard, Optik. 2013, 80, 53-54 which deals with the use of a point detector,
Müller and Enderlein, Phys Rev Letts. 2010, 104, 198101 relative to improved data collection using a CCD device, and
Müller and Enderlein, Phys Rev Letts. 2010, 104, 198101 dealing with pixel reassignment (Sheppard et al., Optics Letts. 2013, 38, 2889-2892).

Such publications requires mathematically intensive procedures as embodied in the integration over the area of detection, whether it be the entire CCD or a smaller region of interest (ROI) is employed, during data acquisition and post signal treatment.

So there is a need of a super-resolution imaging method that is easier to be implemented.

According to a first aspect, the invention proposes an imaging method for obtaining a super-resolution image of an object as mentioned here above, said method being characterized in iterating the following set of steps:
capturing, by the digital camera, a first image of the target region currently illuminated by the focused illumination beam;
extracting, from the captured first image, a first block of pixel values provided by a sub-matrix of the matrix of sensors;
storing said first bloc of pixel values as a first block of pixel values of the super-resolution image;
displacing, by a sub-diffraction limited distance, the support plate by the displacement block along one of the displacement axis;
capturing, by the digital camera, a second image of the target region currently illuminated by the focused illumination beam;
extracting, from the captured second image, a second block of pixel values provided by said sub-matrix of the matrix of sensors;
storing said second bloc of pixel values as a second block of pixel values of the super-resolution image, said second block of pixel values being placed right next to said first block of pixel values in the super-resolution image along the image axis corresponding to said one displacement axis.

Our analogous method to the aforementioned techniques provides for a simple way to get a super-resolution image of an object with limited calculations and treatments.

According to some embodiments of the invention, an imaging method for obtaining a super-resolution mage of an object includes further the following features:
the sub-matrix comprises only one sensor;
a sensor of the matrix is selected as sensor of the sub-matrix in a preliminary step only if said sensor captures a part of the image of the focused illumination beam on the support plate;

the sensor(s) of the matrix is/are selected as sensor(s) of the sub-matrix in a preliminary step as the one(s) among the sensors of the matrix capturing a part of the image of the focused illumination beam on the support plate wherein the image is the most in focus;

the sensor(s) of the matrix is/are selected as sensor(s) of the sub-matrix in a preliminary step as the one(s) among the sensors of the matrix capturing a part of the image of the focused illumination beam on the support plate wherein the image is in geometrical focus;

the method comprises a step of applying a background removal to the pixel values of the super-resolution image and/or including a step of cropping said pixel values that are outside at least one specified range of upper intensity values, in order to remove from the pixel values related to an individual fluorophore (when considering fluorescence microscopy) the overlapping intensities of neighbouring fluorophores;

the object includes at least one fluorescence source, and the illumination source is adapted to produce an illumination beam for generating fluorescence from the illuminated object, the image of the target region captured by the digital camera being an image of the fluorescence generated by the illuminated object, the obtained super-resolution image being a super-resolution fluorescence image;

According to a second aspect, the invention proposes a system for obtaining a super-resolution image of an object, said imaging system including a controller and an optical microscope, said optical microscope including:

a support plate for bearing an object to be imaged, an illumination source adapted to produce an illumination beam for illuminating the object, an optical element for focusing the illumination beam on the support plate, the section of the object on the support plane currently illuminated by the focused illumination beam being called hereafter the target region, a digital camera including a matrix of sensors for capturing an image of the target region, each sensor providing for a respective pixel value, and a displacement block for displacing the support plate relative to the focused illumination beam and to the digital camera along at least two displacement axes among three axes x, y, z perpendicular to each other, wherein the axes x and y define the plane of the support plate, said at least two displacement axes defining two corresponding perpendicular image axes of the super-resolution image;

said imaging system being characterized in that the controller is adapted for iterating the following operation's set of commanding the digital camera to capture a first image of the target region currently illuminated by the focused illumination beam, extracting, from the captured first image, a first block of pixel values provided by a sub-matrix of the matrix of sensors, storing said first bloc of pixel values as a first block of pixel values of a super-resolution image of the object, then commanding the displacement block to displace, by a sub-diffraction limited distance, the support plate along one of the displacement axis, then commanding the digital camera to capture a second image of the target region currently illuminated by the focused illumination beam, extracting, from the captured second image, a second block of pixel values provided by said sub-matrix of the matrix of sensors, and storing said second bloc of pixel values as a second block of pixel values of the super-resolution image, said second block of pixel values being placed right next to said first block of pixel values in the super-resolution image along the image axis corresponding to said one displacement axis.

The present invention is illustrated by way of example, and not by way of limitation, in the figures of the accompanying drawings and in which like reference numerals refer to similar elements and in which.

Same references used in different figures correspond to similar referred elements.

Ordinary Fluorescence Scanning Microscopy

Figures 6, 7, 8:
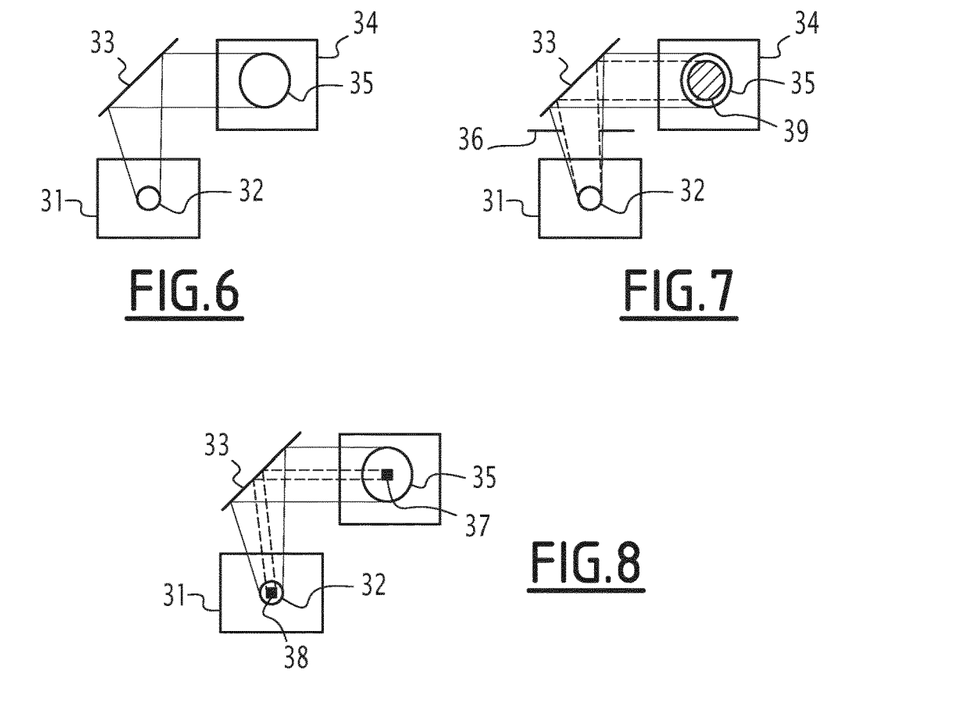
FIG. 6 is a schematic view of an ordinary fluorescence scanning microscope.
FIG. 7 is a schematic view of an ordinary confocal fluorescence scanning laser microscope.
FIG. 8 is a schematic view of a fluorescence scanning microscope according to the invention.

In Ordinary fluorescence scanning microscopy (OFSM), the laser light is focused into a diffraction limited spot exciting the fluorescence of the objects that are inside that spot. The light emitted as the fluorescence is collected by the photo-detector. Then, the laser beam scans the surface of the sample; usually by moving the sample with x-y-(z) translation stage relative to the laser beam. The final fluorescence image is reconstructed from step-by-step measured fluorescence intensities. A generalized scheme of OFSM technical set-up is shown in FIG. 6, showing a fluorescence scanning microscope including a sample plane 31, a diffraction limited laser spot 32, an optical element 33 such as filters cubes and/or mirrors, a detector plane 34, a diffraction limited laser spot's image 35 on the detector plane.

Assuming that there are two single point (infinitely small) sources of fluorescence light on the sample plane and that the wavelength of light is 500 nm and that numerical aperture (NA) of our system is 1.45, therefore the lateral resolution of such system in ideal conditions is approximately equal to 176 nm (0.51*500 nm/1.45), based on the Abbe diffraction limit. Note, that as a general rule the light emitted by two independent fluorescence sources will not be coherent. The image produced by these two objects on the detector plane will represent two circular light spots with surrounding concentric circles with much lower intensity (called Airy patterns). Thus each of these fluorescence sources will produce a typical diffraction image of the single point source on the detector plane comprising a central bright part and surrounding concentric rings.

The main intensity of the fluorescence will be accumulated inside a central bright part, which in general can be nominally described as a Gaussian distribution. In the following description, the influence of the concentric rings will be neglected and the only central part will be taken into account. Moreover, in case of OFSM small size detectors as often used, so mainly central part of the image is only collected for step-by-step fluorescence image reconstruction.

The collected signal for a single scanning step in case of OFSM will be the integrated fluorescence intensity of the total fluorescence signal hitting the detector while measuring that point. In the ideal case it is only the centre of the diffraction image. In the considered assumption (wavelength of light of 500 nm, NA=1.45) and under ideal experimental conditions the cross section of the central part of the signal collected can be represented as a Gaussian with the full width at half maximum (fwhm) of 176 nm. Consequently, the total signal intensity for the single point in the future fluorescence image is the signal limited by fwhw=176 nm Gaussian distribution. In order to determine the resolution of the system in these ideal conditions, behaviour of the two Gaussian distributions can be checked in order to determine when they can no longer be distinguished as individual objects.

In order to achieve this, one can examine the second derivative of the overlapping Gaussians (which is a more precise method). In a more simplistic approach it can be looked at how the regions of the fluorescence signal registrations overlap. It is intuitive that a normal OFSM microscope will never reach the above theoretical resolution of 176 nm (unless the detector is small and rightly positioned). In addition, it can be seen from the cross sections of two single point sources on the detector plane for the OFSM registration conditions that there is no simple way to resolve two single point sources in the ideal case for OFSM even at the 200 nm distance.

Confocal Fluorescence Scanning Laser Microscopy

The main difference of confocal fluorescence scanning laser microscopy to that of the aforementioned OFSM is the insertion of an additional small size pinhole which removes/blocks part of the spectral contamination due to the presence of the additional rings from the Airy disk, thus the detector receives only the central part of the fluorescence that was excited by the incident laser beam. As a general rule, the best resolution is obtained in case when one uses a pinhole equal to one Airy unit.

A schematic confocal fluorescence scanning laser microscope is shown in FIG. 7 including an additional pinhole 36 compared to the microscope of FIG. 6 and thereby providing a diffraction limited laser spot's image 39 on the detector plane 34. As shown, the diffraction limited laser spot's image 39 is only a section of the diffraction limited laser spot's image 35 obtained with the microscope of FIG. 6.

The aforementioned example of two single point fluorescence sources as observed by an OFSM with the insertion of a one Airy unit pinhole in the optical path (the bigger the pinhole the lower is the resulting image quality and resolution) is now re-examined in regard to such a OFSM. The registered intensity of the signal will be mainly the integral intensity area limited between bars, where distance between the bars equals the fwhm. Therefore, in contrast with OFSM two single point fluorescence sources lying 200 nm apart should be easily resolvable in a confocal regime with a 1 Airy unit pinhole. Thus, the theoretical predicted resolution can be achieved.

Super-Resolution Microscopy According to the Invention

The present invention goes some steps further:
  i) For the image reconstruction a single pixel (or a single block of pixels) is used that is located within the central area of the diffraction limited spot on a detector plane and which is smaller than the diffraction limited spot on the detector plane.
  ii) A (flat) background is removed in an embodiment. Consequently, the bulk of the fluorescence signal (when considering fluorescence microscopy), which originates from the object lying in the geometrical optical axis of the pixel, is used for image reconstruction.

Employing these two steps a significantly higher resolution is achieved, and avoid the use of complicated data acquisition methods and subsequent analytical procedures. It is obvious that not only one pixel is available for image reconstruction, a few pixels can be used successfully, producing shifted images available for averaging. Moreover, the possibility for three dimensional picture recovery from the single scan exists because every pixel probes at a different geometric point within the three dimensional object under investigation. The generalized scheme of the technical set-up is shown in FIG. 8. showing a schematic microscope according to the invention showing a single pixel 37 inside the diffraction limited laser spot's image 35 in the detector plane 34 used for reconstructing the final image, and showing also a geometrical projection 38 of the detector's pixel 37 on the sample plane 31.

In addition, scanning with significantly precise and small steps is a requisite. However step size can be relatively large in cases where we use images obtained from multiple pixels for averaging (with necessary corrections), therefore making the overall scanning faster.

Figure 9:
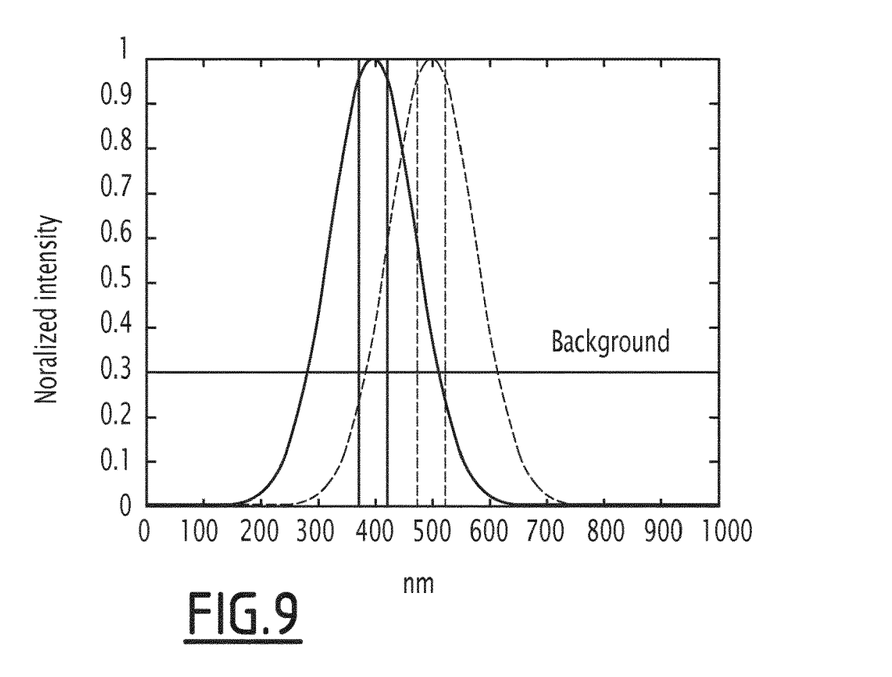
FIG. 9 shows the cross sections of the normalized intensity in the detector plane for two single point fluorescence sources.

For example, looking into the aforementioned case in an example of a fluorescence microscopy, and referring to FIG. 9 showing the cross sections of the normalized intensity in the detector plane for two single points fluorescence sources, it is possible to resolve two single point sources of fluorescence lying at a distance of 100 nm by applying a "detector" pixel size of ~50 nm (here assumed to be circular) and 30% flat background removal. Greater background removal is often better, but it is always a trade in with signal to noise ratio. Smaller pixel sizes lead to lower background removal sizes and better resolution and signal to noise ratio.

Thus the present invention is analogous to other super-resolution imaging techniques but not based on them.

This present invention is able to obtain super-resolution images under high magnification that is comparable with other known techniques.

This present invention is able to increase the resolution of any image, irrespective of the value of magnification of the sample. Hence, this present invention is able to improve images at low-magnification hitherto considered to be not suitable for high-resolution imaging.

Herebelow a particular embodiment of the invention is described.

Figure 1:
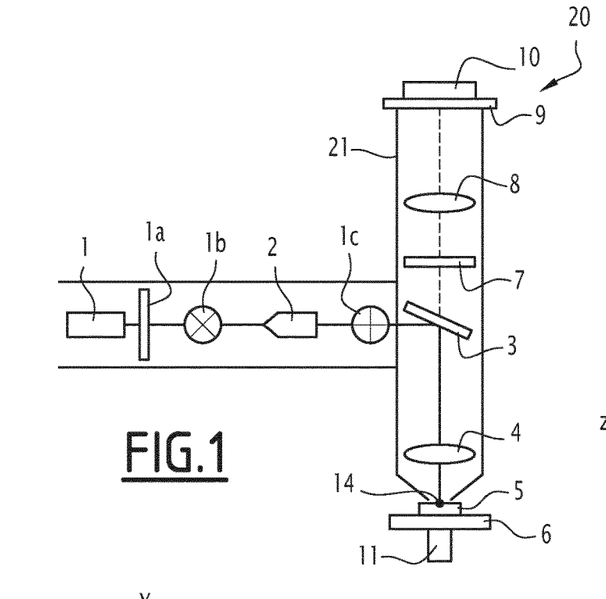
FIG. 1 shows a schematic lateral view of a system for obtaining a super-resolution fluorescence image of an object in an embodiment of the invention.

A system 20 for obtaining a super-resolution fluorescence image of an object in an embodiment of the invention is schematically represented in FIG. 1.

The system 20 includes an optical microscope 21.

The optical microscope 21 includes an illumination source 1, a spatial filter 2, a dichroic mirror 3, an objective 4, a platform 6, an emission filter 7, a combination 8 of lenses, for example achromatic, and a digital camera 9.

Optionally the optical microscope 21 further includes a light filter 1a.

The optical microscope 21 can be a microscope usually used for capturing fluorescence images, such as the Nikon Ti Eclipse® for example.

The system 20 further includes a controller 10 and a motion block 11.

The sample 5 to be imaged is adhered to a standard coverslip, or other suitable support, that is fixed rigidly by a sample holder on the platform 6.

The sample's surface on the platform 6 lies on a plane define by the perpendicular axes x, y.

Figure 2:
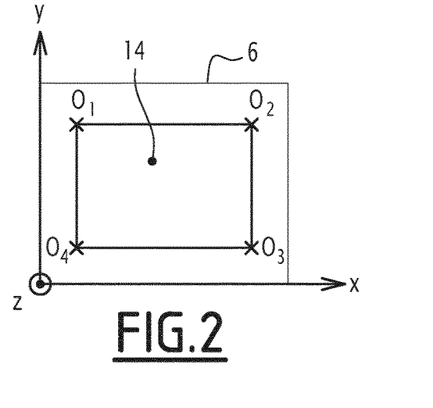
FIG. 2 is a representation of a top view of the platform supporting the sample.

A top view of the sample on the platform 6 is represented in FIG. 2.

According to classical fluorescence imaging, tiny fluorescence sources, for example fluorophores based upon the one photon fluorescence physical phenomenon, has been attached to the sample 5. These fluorescence sources can be intrinsic to the sample.

The illumination source wavelength is chosen to induce fluorescence from the attached fluorescence sources: the fluorescence sources, when lightened by the illumination source, absorb the energy of the illumination source's wavelength(s) and emits fluorescence light, whose wavelength is higher than the illumination source's wave length(s).

The controller 10 is adapted for defining displacement commands and providing the displacement commands to the motion block 11.

The displacement commands are defined by the controller 10 as a function of a predetermined Region of Interest (ROI) of the sample 5. A displacement command commands the motion block 11 to displace the platform 6 and specified the commanded displacement along the axes x, y, z, z being an axis perpendicular to the axes x, y.

The controller 10 is further adapted to trigger the capture of an image by the digital camera 9 by sending a capture command to the digital camera 9, and the controller 10 is adapted to construct the super-resolution image of the sample ROI from successive fluorescence images captured by the digital camera 9, as detailed hereafter.

In an embodiment, the controller 10 includes a microprocessor and a memory (not represented). The memory stores software instructions 10, which, when executed by the microprocessor, produce the operation of the controller 10.

The digital camera 9, for example includes a two-dimension (2D) matrix of sensors wherein each sensor is adapted to detect a local fluorescence intensity during a determined time.

The digital camera 9 is adapted to capture an image upon reception of a capture command from the controller 10.

When the digital camera 9 is capturing an image of a sample currently illuminated by the illumination source 1, each sensor detects a respective local fluorescence intensity and the camera 9 then determines, for each pixel corresponding to each sensor, a respective pixel intensity as a function of the local fluorescence intensity detected by the sensor.

The digital camera 9 is then adapted for providing an image composed of a matrix of pixels (the position of a pixel in the matrix of pixels is the same as the position of the corresponding sensor in the matrix of sensors).

Figure 3:
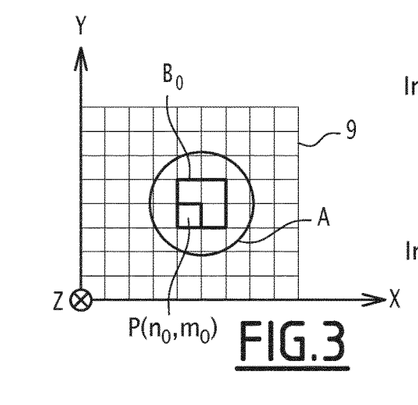
FIG. 3 is a representation of a bottom view of the camera sensor matrix.

FIG. 3 represents a bottom view of the sensor matrix of the camera 9. Said sensor matrix has L ranks of sensors parallel to the axis x and I columns of sensors parallel to the axis y. This view of FIG. 3 is also considered as representing the matrix of the L×I pixels of an image captured by the camera 9, wherein I is the size of the matrix along an image dimension X corresponding to the axis x, and L is the size of the matrix along an image dimension Y corresponding to the axis y.

The motion block 11 is adapted for receiving displacement commands from the controller 10 and for, upon reception of such a command defining a commanded displacement, moving the platform 6 by the commanded displacement The operation of the optical microscope 21 is explained hereafter.

The illumination source 1 emits monochromatic light.

If necessary, as a function of wavelength involving fluorescence from the sample (excitation wavelength), the emitted light is cleaned by the optional LASER (Light Amplification by Stimulated Emission of Radiation) filter 1a in order to reject, from the emitted light, the wavelengths distinct from the excitation wavelength.

Collimation of the light is obtained by use of the spatial filter 2.

The exciting light beam of thus collimated incident light passes through the dichroic mirror 3 (as known, the dichroic mirror 3 lets exciting beam to fall on the platform 6 and reflects fluorescence light to the digital camera 9) and through the objective 4 in order to produce a focused diffraction-limited spot 14 on the sample 5 supported by the platform 6.

The fluorescence light, emitted by the area of the sample 5 covered by the spot 14, returns along the incident optical path, via the objective 4, which magnifies the sample image, to the dichroic mirror 3, and continues onwards to the emission filter 7 that keeps only the fluorescence wavelength(s) of interest.

The combination (of optional) lenses 8 further magnify the fluorescence light provided onto the camera sensor matrix 9.

The sensor matrix of the camera 9 is positioned in regard to the spot 14 so that the fluorescence light emitted by the sample area in the spot 14 is collected towards the sensor matrix.

As known, fluorescence measurement requires that a pulse of incident light arrives at the sample. This is obtained by placing a shutter (not shown) at the exit of the source 1.

The sample surface to be imaged has to be in focus in the z-axis.

Such focus is preliminary obtained for example by a piezo device attached to the objective 4, or by commanding a displacement along the axis z of the platform 6 by the controller 10 to the motion block 10.

In an embodiment, a LASER is used as the illumination source 1, either of constant intensity (Continuous Wave—CW) or pulsed.

In an embodiment, the magnification of the objective 4 for the fluorescence light is in the range that is defined by the specifications of the digital camera and the zoom of the combination 8 of lenses as required.

The digital camera 9 is for example a 2D detector for example an (Electron Multiplying) Charge Coupled Device ((EM)CCD) type, or a CMOS (Complementary Metal Oxide Semiconductor). The 2D detector may be replaced by a 1D detector, or point detector, if required. In this latter case, B0 is equal to I×L, in the description described below.

The numbers L and I are for example in the range [128, 512].

In an embodiment, each EMCCD pixel is a square of s×s $\mu m^2$ where s is in the range [6 μm, 15 μm].

For example, when using an objective of NA=1.45, the diameter of the spot 14 in the plane (x,y) is in the range [150 nm, 350 nm].

These here above values are of course given only as examples and are dependent on the type of camera used.

In an embodiment, a combination of illumination sources may be used such that the collimated beams all have the same trajectory when arriving at the dichroic mirror 3. In order to remove any potential artefacts due to different polarities of the laser beams they are depolarised incident to the dichroic mirror 3. Firstly, the polarity of all the laser beams is orientated to the same direction by the linear polarizer 1b. Secondly, an assembly 1c of a circular polarizer coupled to an achromatic depolarizer 1c is inserted into the optical path immediately after the spatial filter 2. Alternatively, if the combination of wavelengths and laser output powers are too diverse, each laser beam will have its own spatial filter 2 prior to arrival at the depolarizer 1c. The beam will thus converge after the spatial filters 2. If the use of fully depolarised beams is not considered to be required this option may be removed from the optical path, leaving only the spatial filter(s) 2.

Figure 5:
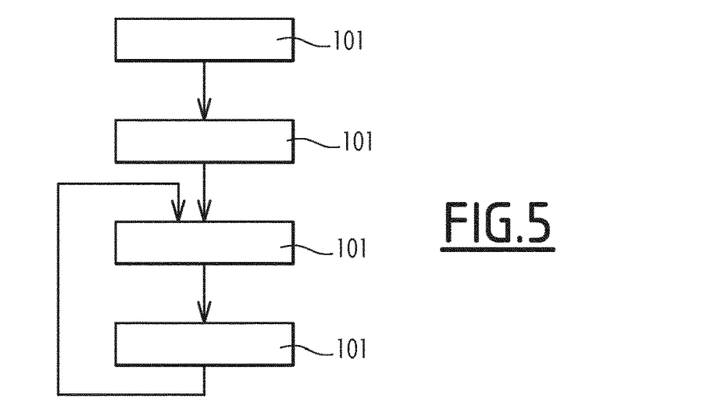
FIG. 5 represents steps of a method for obtaining a super-resolution fluorescence image of an object in an embodiment of the invention.

According to an embodiment of the invention, the following steps are implemented based on the system 21.

In the considered embodiment, the spot 14 does not move relative to the camera 9 during the construction of a super-resolution image according to the invention.

In a first step 101, a block of sensors $B_0$ is chosen among the I×L sensors of the camera 9. The number of sensors n inside $B_0$ is strictly less than I×L.

The sensors of the block $B_0$ form a square in the sensor matrix.

The sensors of the block $B_0$ form the sensor matrix which may be any shape (square, rectangle, oval, linear array, single point, etc.). Hereon, we shall consider the case of the block B0 being a square of dimension n.

For example, n is equal to 1, or any other size that is deemed suitable. The value of n is for example less than 4, 16, 25.

The block of sensors $B_0$ is further chosen so that the block of pixels corresponding to the block $B_0$ of sensors is located inside the image, referenced A in FIG. 3, of the spot 14 in any captured image. It means that the size of the block of pixels corresponding to the block of sensors $B_0$ is smaller than the size of the diffraction spot 14's image (the block of pixels corresponding to the block of sensors $B_0$ is indeed inside the diffraction spot 14's image).

In the following, n=1 is considered: $B_0$ comprises only the $(n_0, m_0)$ sensor of the matrix of sensors, i.e. the sensor of position $(n_0, m_0)$ in the matrix of sensors.

In a step 102, a ROI of the sample 5 is defined, for example the ROI defined by the rectangle $O_1$, $O_2$, $O_3$, $O_4$ in the plane of the FIG. 2's top view, and the definition of this ROI is provided to the controller 10.

For example, the ROI bounds an entire prokaryote, or small subcellular structure, cf. actin filaments, in a larger biological sample 5.

A value of distance step is defined, called d hereafter. d is for example chosen by an operator.

The value of d is strictly smaller than the diffraction limit of the optical microscope 21: $d < 0.51 \cdot \left(\dfrac{\lambda}{NA}\right)$, where λ is the wavelength of the illumination source 1, and NA is the numerical aperture of the lens in the objective 4.

For example, in case the diffraction limit is 200 nm, d is chosen in the range [15 nm, 50 nm].

Then the controller 10 will commands the progressive scanning of the ROI by steps of distance d along the axis x, or along the axis y, from an initial point of the ROI in reiterated steps 103 and 104 as detailed hereafter.

At first, an initial displacement of the platform 6 is determined by the controller 10 in regard to the current position of the platform 6.

In the considered embodiment, the initial displacement of the platform 6 is determined by the controller 10 in order to firstly direct the focused diffraction-limited spot 14 on the point $O_1$.

A displacement command is provided by the controller 10 to the motion bloc 11, indicating the determined initial displacement.

Upon reception of this displacement command, the platform 6 is positioned by the motion block such that the spot 14 covers the point $O_1$.

In a first iteration of step 103, the controller 10 triggers the capture of an image by sending to the camera 9 an image command whereas the spot 14 covers the point $O_1$.

Upon reception of this capture command, the camera 9 captures an image as a function of the currently fluorescent light collected by the sensor matrix.

The controller 10 extracts, from the captured image, the block of pixels corresponding to $B_0$ at this first iteration. Thus in the considered embodiment, it extract the intensity of the pixel $P(n_0, m_0)$ corresponding to the $(n_0, m_0)$ sensor (i.e. the pixel of position $(n_0, m_0)$ in the matrix of pixels).

This extracted intensity is called $Int(n_0, m_0)_{1,1}$.

Figure 4:
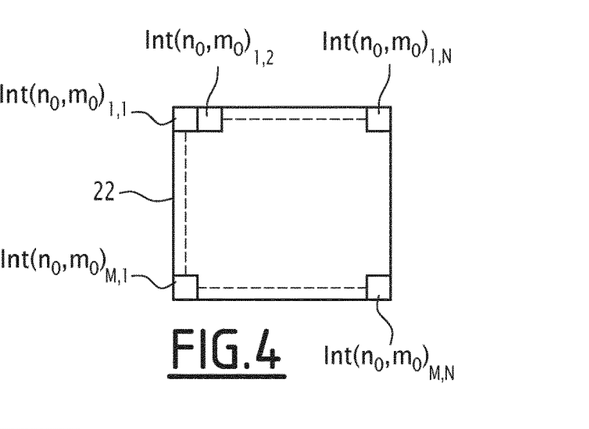
FIG. 4 is a view of a super-resolution image obtained according to an embodiment of the invention.

Said intensity $Int(n_0, m_0)_{1,1}$ is stored as the intensity of the pixel of position (1,1) in the matrix of pixels of the super-resolution image 22, referring to FIG. 4.

Then in a first iteration of step 104, the controller 10 commands to the motion block 11 a displacement of d along to the axis x from the current position, so that the spot 14 be displaced relative to the sample 5 on platform 6, along x in direction of the limit of the ROI defined by [$O_2$, $O_3$].

And the motion block 11, upon reception of the displacement command, displaces the platform 6 accordingly to the received displacement command.

Then, in a second iteration of step 103, the controller 10 triggers the capture of an image by sending to the camera 9 an image command.

Upon reception of this capture command, the camera 9 captures an image as a function of the currently fluorescent light collected by the sensor matrix (emitted from an area of the sample shifted by distance d from $O_1$ along the axis x.

The controller 10 extracts, from the captured image, the block of pixels corresponding to $B_0$ at this second iteration of step 103, thus in the considered embodiment, it extract the intensity of the pixel $P(n_0, m_0)$ corresponding to the $(n_0, m_0)$-sensor.

This intensity is called $Int(n_0, m_0)_{1,2}$.

Said intensity $Int(n_0, m_0)_{1,2}$ is stored as the intensity of the pixel of position (1,2) in the matrix of pixels of the super-resolution image 22, referring to FIG. 4.

In the super-resolution image 22, this pixel is adjacent according, to the axis X, to the pixel of intensity $Int(n_0, m_0)_{1,1}$ previously stored.

Then in a second iteration of step 104, the controller 10 commands to the motion block a displacement of d along to the axis x from the current position so that the spot 14 be displaced relative to the sample 5 on platform 6, along x in direction of the limit of the ROI defined by ($O_2$, $O_3$).

And the motion block 11, upon reception of the displacement command, displaces the platform 6 accordingly to the received displacement command.

The group of steps 103 and 104 is reiterated along the axis x until the $N^{th}$ iteration, wherein the position of platform is such that the spot 14 directs to point $O_2$.

At said $N^{th}$ iteration of step 103, the intensity $Int(n_0,m_0)_{1,N}$ of the pixel $P(n_0,m_0)$ is stored as the intensity of the pixel of position (1,N) in the matrix of pixels of the super-resolution image 22. In the super-resolution image 22, this pixel being adjacent according to the axis X to the pixel of intensity $Int(n_0,m_0)_{1,N-1}$ previously stored.

The controller 10 detecting that that the limit of the ROI along the axis x has been reached, in the $N^{th}$ iteration of step 104, the controller 10 commands to the motion block 11 a displacement command of d along to the axis y this time, from the current position so that the spot 14 be displaced from $O_2$ relative to the sample 5 on platform 6, along y in direction of the limit of the ROI defined by ($O_3$, $O_4$).

And the motion block 11, upon reception of the displacement command, displaces the platform 6 accordingly to the received displacement command.

Then at the $N+1^{th}$ iteration of step 103, the intensity $Int(n_0,m_0)_{2,N}$ of the pixel $P(n_0,m_0)$ is stored as the intensity of the pixel of position (2,N) in the matrix of pixels of the super-resolution image 22.

In the super-resolution image 22, this pixel is adjacent according to the axis Y to the pixel of intensity $Int(n_0,m_0)_{1,N}$ previously stored.

Then at a $N+1^{th}$ iteration of step 104, a displacement of d along to the axis x from the current position so that the spot 14 be displaced relative to the sample 5 on platform 6, along x in direction of the limit of the ROI defined by ($O_1$, $O_4$) is commanded by the controller 10 to the motion block 11.

And the motion block 11, upon reception of the displacement command, displaces the platform 6 accordingly to the received displacement command.

Successive iterations of the group of steps 103 and 104 are applied, displacing the spot 14 by step of d along the axis x towards the side ($O_1$, $O_4$) of the ROI, thus constructing the second rank of pixels of the super-resolution image 22, from $Int(n_0,m_0)_{2,N}$ to $Int(n_0,m_0)_{2,1}$ reached at the $2N^{th}$ iteration of step 103.

Then at a $2N^{th}$ iteration of step 104, similarly to the explanations here below, he controller 10 then detects that the limit of the ROI along the axis x has been reached, and consequently in the $2N^{th}$ iteration of step 104, the controller 10 commands to the motion block 11 a displacement command of d along the axis y from the current position so that the spot 14 be displaced from the current position along y in direction of the limit of the ROI defined by ($O_3$, $O_4$).

And the motion block 11, upon reception of the displacement command, displaces the platform 6 accordingly to the received displacement command.

And similar iterations are processed until all the ROI have been scanned by the spot 14, by successive displacements of distance d each one.

In the considered case wherein the ROI is rectangle, the resulting super-resolution image 22 comprises M ranks and N columns of pixels, wherein $$N = E\left(\frac{\|O_1 O_2\|}{d}\right) + 1 \text{ et } M = E\left(\frac{\|O_2 O_3\|}{d}\right) + 1,$$

wherein E is the function "integer part" and $\|PP'\|$ is the function providing the distance between the two points P and P'.

But in other embodiments, the ROI can have various shapes and the controller 10 is adapted to scan the whole ROI and to construct the super-resolution image for this ROI.

In an embodiment, the scan in a plane (x,y) through sub diffraction displacements and the construction of the super-resolution image by successive extracted pixel block according to the invention is repeated for each plane z if collected (i.e. for successive layers through the sample, thus constructing a 3D super-resolution image).

Here below, the provided super-resolution image correspond to a scan in the plane defined by the axes x and y. In another embodiment, the scan and construction of super-resolution image is achieved in a plane defined by the axes x and z, or by the axes y, and z. Then the sub-diffraction displacements are achieved along the considered axes x and z or y and z, instead of the axes x and y as described here below.

In the detailed embodiment disclosed here below, the number n in the block $B_0$ was considered to be equal to 1.

In case wherein the n is bigger than 1, the process is similar.

Thus when a first image and a second image are captured in successive steps 103, the position of the platform 6 for the first image being separated from the position of the platform 6 for the second image by a displacement d less than the diffraction limit in a direction along the axis x (respectively y), the super-resolution image will include a first block of pixels, said first block of pixels being the block of pixels corresponding, in the first image, to the block $B_0$ of n sensors. And the super-resolution image further includes, adjacent to said first block of pixels in the direction along the axis X (respectively Y), a second block of pixels, said second block of pixels being the block of pixels corresponding, in the second image, to the block $B_0$ of n sensors etc.: the super-resolution image is constructed by the blocks of pixels successively captured by the block B0 after each sub-diffraction displacement. After the series of images are collected and the fluorescence image is reconstructed as stated (steps 103-104), in some embodiments a further step of removing a (flat) background is implemented if required; the data of the fluorescence image (when considering fluorescence microscopy) are then in an embodiment cropped such that only a specified range of upper fluorescence intensity values are plotted. This allows one to better discriminate between individual fluorophores by removing/reducing the overlap of the fluorescence signal from neighbouring emitters.

For clarity, we consider that the fluorescence image which has been reconstructed from the acquisition protocol (steps 103-104) has a normalized intensity range from 0 (minimum) to 1 (maximum). In the simplest case, a simple background can be removed for example, for each 2D sub-image of the super-resolution image, an estimation of a background noise intensity, estimated in an embodiment from an image obtained from a non fluorescence area) is subtracted to the pixel intensities of the 2D sub-image. Then the resulting fluorescence image can be scaled from 1 to X %, where X represents a user-defined normalized intensity value less than 1: the intensity value below X % are replaced by a value equal to zero, the intensity value V beyond X % are transformed into (1−X %)V.

This results in a plot that represents only the top X % (for example 30%) of the reconstructed signal, where the different fluorophores are deemed not to greatly interfere with each other, as in the example illustrated in FIG. 9. The removal of the background, in particular the value of X, is specific to each sample of interest. Such a value is estimated in a preliminary stage.

Alternatively, a series of normalized intensity slices can be recreated, ranging from 1 to Xa, Xa to Xb, Xb to Xc, etc., where a,b,c, etc. represent user defined intensity values.

The sample considered in the embodiment detailed here below is a biological sample, but the sample could be non-biological in another embodiment.

According to the embodiment described here below, the sample to be imaged is moved relative to a fixed beam of collimated light and to a fixed camera. But in another embodiment, the sample is fixed whereas the motion is applied to the assembly of the collimated beam and the fixed camera.

The displacements can be applied by stepwise or by constant motion.

In an embodiment, given the size n of the block $B_0$, the sensor(s) of the block $B_0$ in the step 101 are chosen according to the following way: the sample 5 is displaced so that the spot 14 is directed on a test area of the sample 5) containing fluorescence beads (or a different test sample containing fluorescence beads is used). An image is captured by the camera 9. The sections of image provided by all the blocks of n pixels inside the image of the spot 14 are analysed in order to determine the section that is the most in focus by examining the quality of the signal, and, for example, with reference to fluorescence properties of known samples. Often fluorescent microspheres (with defined diameters of between ca. 50 and 2000 nm) which provide a near perfect Gaussian distribution (when not aggregated) of fluorescence intensity are used to determine the section that is the most in focus. The block of sensors corresponding to the block of pixels with the best focus is then chosen as the block B0.

This disposition prevents from any additional scattered light that would blemish the super-resolution image.

The quality of the super-resolution image will be improved if the fluorescence sources of the sample 5 result in discrete sources of emission, and are not so concentrated that it results in a carpet of fluorescence intensity.

The method according to the invention was applied to the H-nS protein, a DNA-binding protein, as sample, which is tagged with the fluorophore GFP (Green Fluorescent Protein), in *Escherichia (E.) coli* cells. The images obtained according to the invention results present a superior resolution compared to images obtained using a super-resolution technique called STORM according to the results published in Wang et al., Science (2011) 333, 1445-1449).

As an illustration, FIGS. 10 to 15 enables to compare the performance of the images obtained according to the invention with the STORM images when observing H-NS-GFP fusion and to form two foci in living cells.

A brief description of these figures is made before describing the experience carried out and comparing the performance of the images obtained according to the invention and STORM images.

Figure 10:
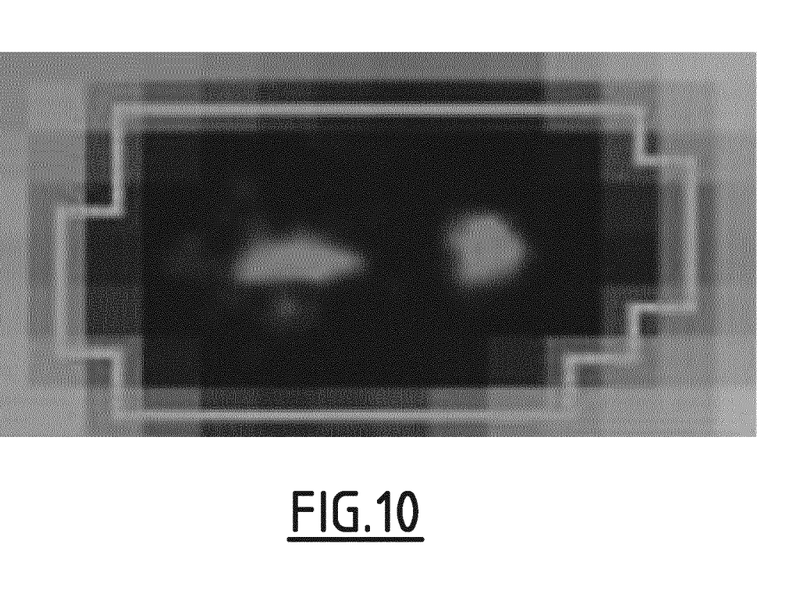
FIGS. 10 to 15 are illustrative figures of a comparative measurement between STORM imaging (Wang, Science 2011. 333, 1445-1449) and the super-resolution imaging technique according the invention.

FIG. 10 is a reconstructed STORM image from Wang et al. (2011) of an *Escherichia coli* cell tagged with GPF. The STORM image is superimposed upon the classical confocal fluorescence image. Hence, the squares are the pixels of the EMCCD camera (Ixon DV897DCS-BV, Andor). The outline represents the limit of the bacterial cell. The two intense interpolated spots represent the loci of GFP-tagged H-NS protein.

Figure 11:
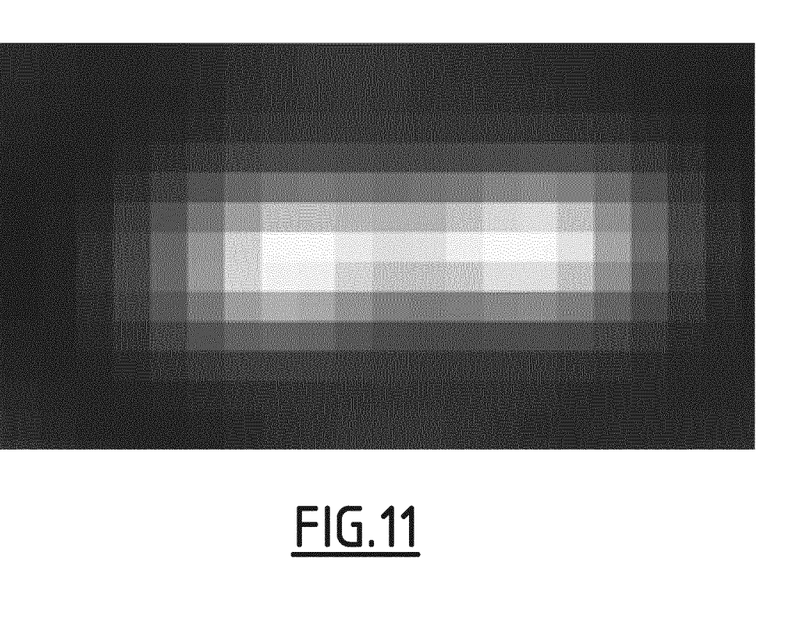

FIG. 11 is a classical confocal fluorescence image of an *Escherichia coli* cell tagged with GFP captured by the EMCCD camera (Ixon 987 Ultra, Andor) used in this invention. The squares correspond to the pixels of the EMCCD camera. The pixel size of the camera used in this invention is the same as that of the STORM image (FIG. 10), thus the confocal fluorescence image according to the invention is similar to that represented in the article by Wang et al. (2011).

Figure 12:
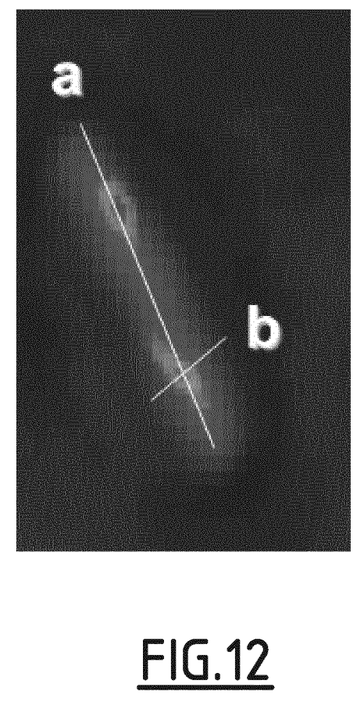

FIG. 12 is a reconstructed image of an *Escherichia coli* cell tagged with GPF using this invention superimposed upon the classical confocal fluorescence image. The squares represent a unit (vis. displacement increment) of 50 nm, according to our invention. The two intense spots, contain significant signal intensity information, and represent the spatial distribution of GFP-tagged H-NS protein. The outline of the bacterial cell can be clearly observed. (a) and (b) are the locations where histograms have been plotted to high-light the enhanced signal information, see FIGS. 14 and 15, especially when compared with the classical confocal fluorescence image in FIG. 13.

Figure 13:
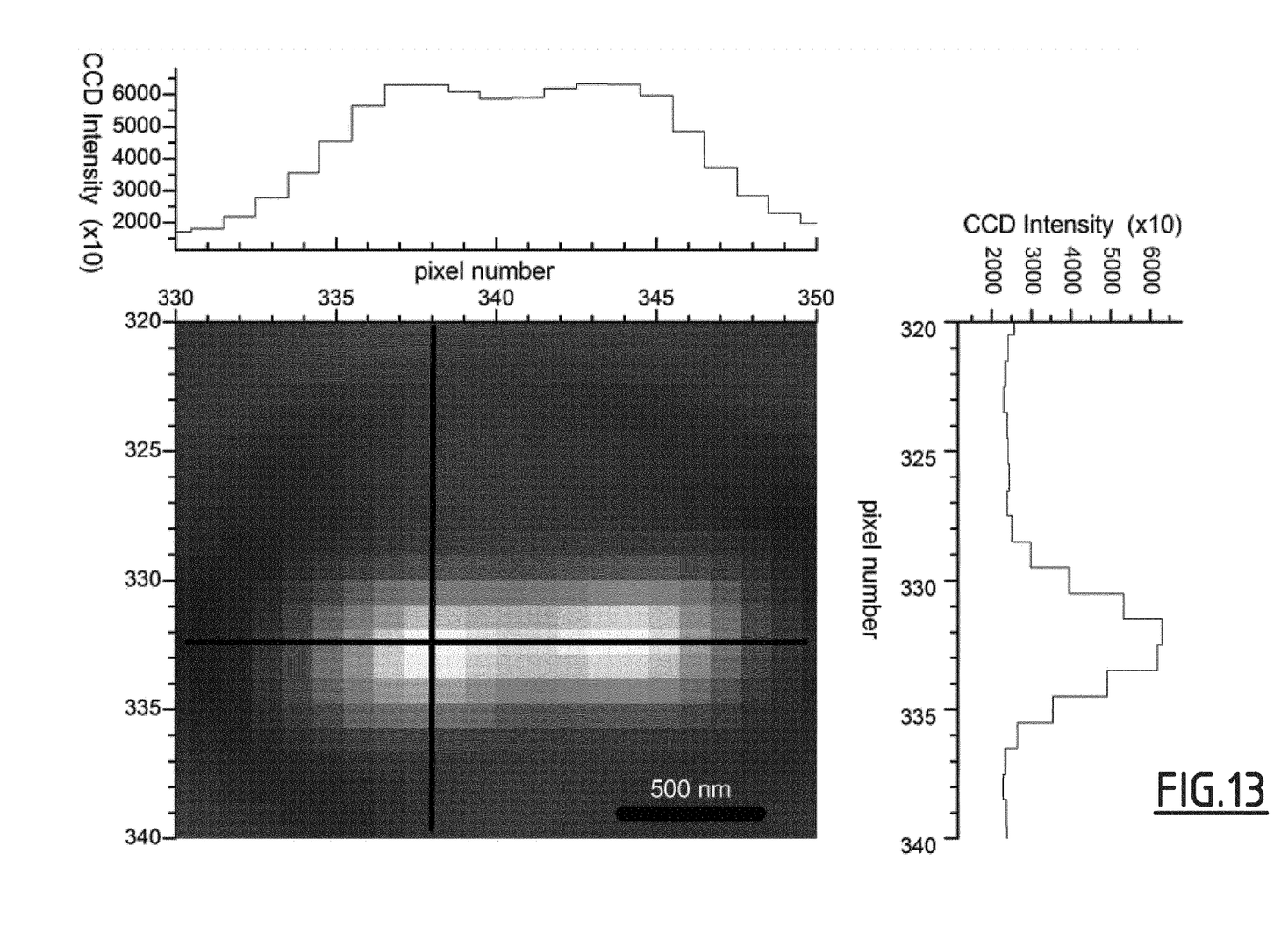

FIG. 13 is a classical confocal fluorescence image of an *Escherichia coli* cell tagged with GFP captured by an EMCCD camera (Ixon 987 Ultra, Andor). The x,y co-ordinates are given as camera pixel positions (in this case a 512 by 512 array). The black cross-hairs mark the positions of the intensity cross-sections (histograms). Intensity in CCD counts. Scale bar, 500 nm.

Figure 14:
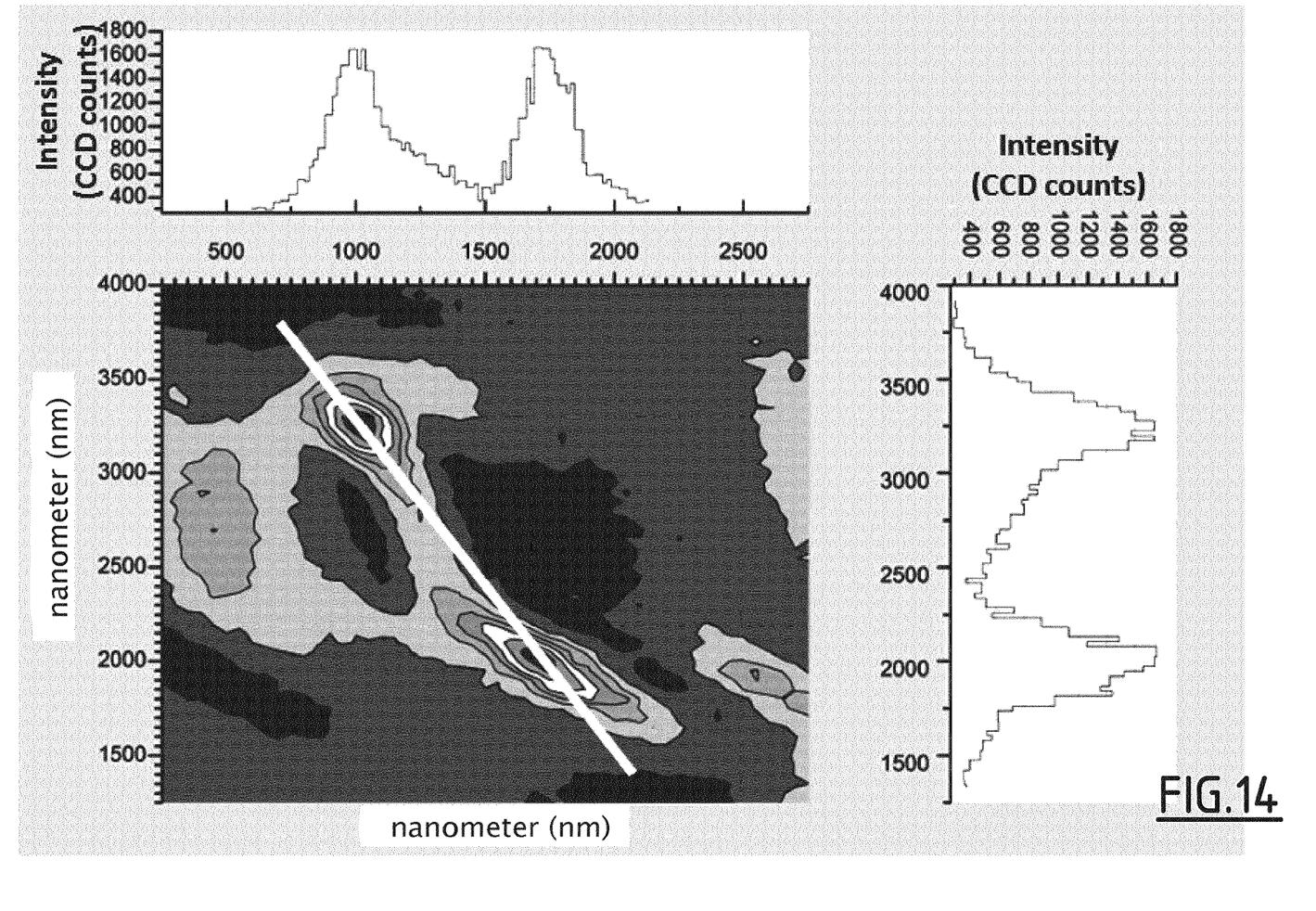

FIG. 14 is a summary of the spatial resolution and signalto-noise obtained using this invention as evidenced by cross-section (a) in FIG. 12. The x,y units are in nanometers and are relative to a point of origin not observed in the figure. The data in the histograms have not be interpolated and represent the output from the imaging method described herein, in this case a displacement distance of 50 nm in the X and Y planes.

Figure 15:
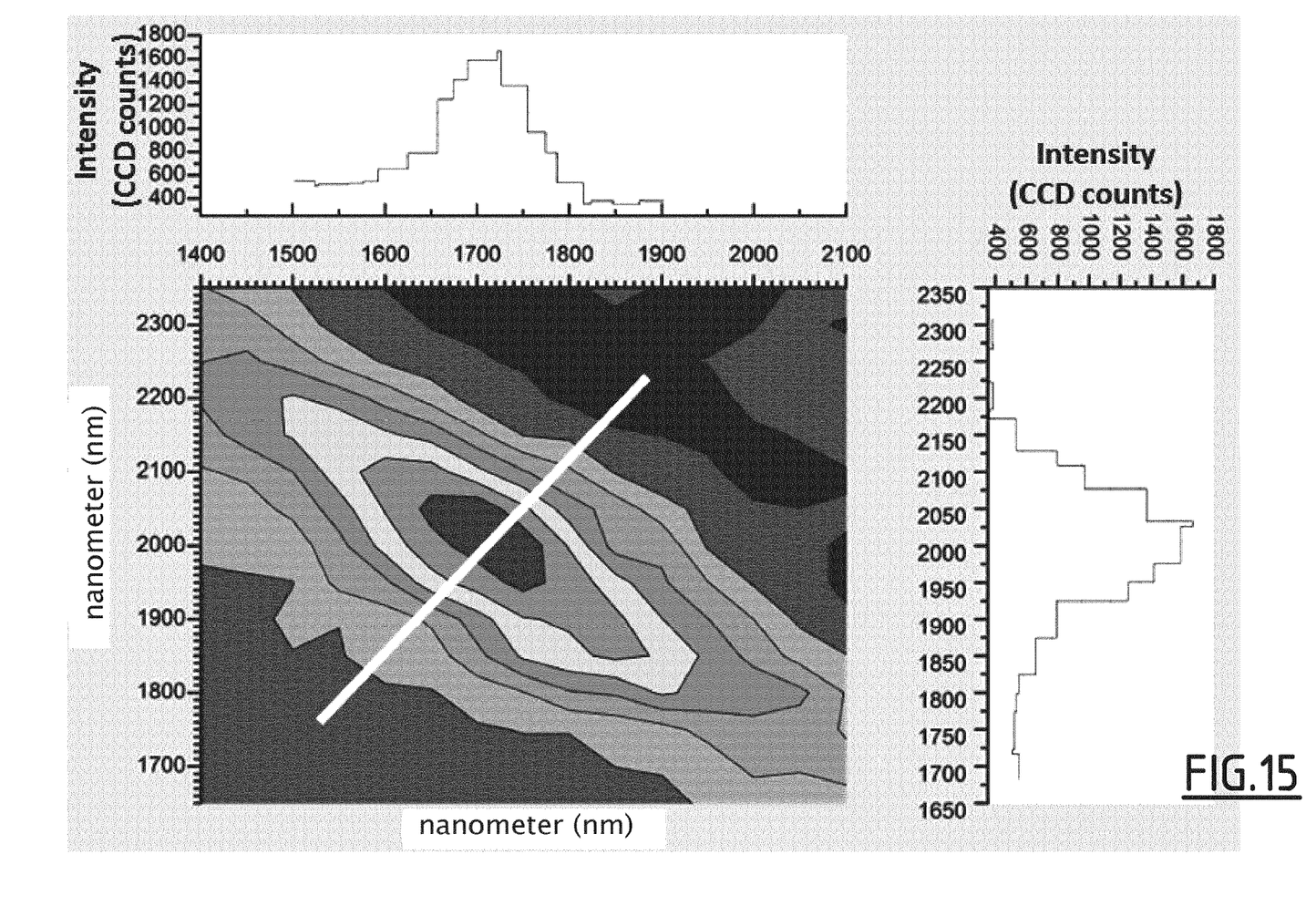

FIG. 15 is a summary of the spatial resolution and signalto-noise obtained using this invention as evidenced by cross-section (b) in FIG. 12. The x,y units are in nanometers and are relative to a point of origin not observed in the figure. The data in the histograms have not be interpolated and represent the output from the imaging method described herein, in this case a displacement distance of 50 nm in the X and Y planes.

FIG. 10 shows the corresponding image obtained by Wang et al. FIG. 11 shows the bright field image of the *Escherichia coli* expressing H-NS-GFP and FIG. 12 represents the super-resolution fluorescence images obtained with the present invention. A culture of *Escherichia coli* MG1655Z1 expressing H-NS-GFP was harvested, the cells washed in phosphate-buffered saline, fixed with formaldehyde (Sigma, Saint-Louis, USA) and then layered onto an agarose (Invitrogen, Carlsbad, USA) bed sandwiched between to glass coverslips (Xiao et al., 2007, in Single Molecule technics: A laboratory Manual, P. Selvin, T. Ha, Eds. Scold Spring Harbor Laboratory Prees, pp 149-170). An excitation wavelength of 488 nm was provided by an OBIS laser (Coherent, Les Ulis, France) and Fluorescence data collected with a 59904-ET-488/561 nm Laser Dual Band Set (Chroma Technology Corporation, Bellows Falls, USA) mounted in a Nikon-Ti microscope fitted with an 100×CFI Plan Apochromat objective lens and coupled to a EMCCD camera (Ixon 987 Ultra, Andor). Induvial images were recorded with an acquisition time of 20 ms and the reconstructed image created as described herein.

The scale of the images is the same. This enables to carry out a qualitative comparison. When contemplating the figures, it appears that it is visually easier to separate both foci with the method of the invention.

FIGS. 13 to 15 enables a quantitative comparison between FIGS. 11 and 12. For instance, assuming that resolution is defined by the ability to distinguish between two light distributions when at half the maximum intensity, both light distributions are still distinguishable, the resolution of the method of the invention is sufficient to distinguish the two foci while the resolution of the method according to FIG. 11 is not sufficient to distinguish the two foci.

This experimentally shows that the method of the invention provides with a better resolution.

Figure 16:
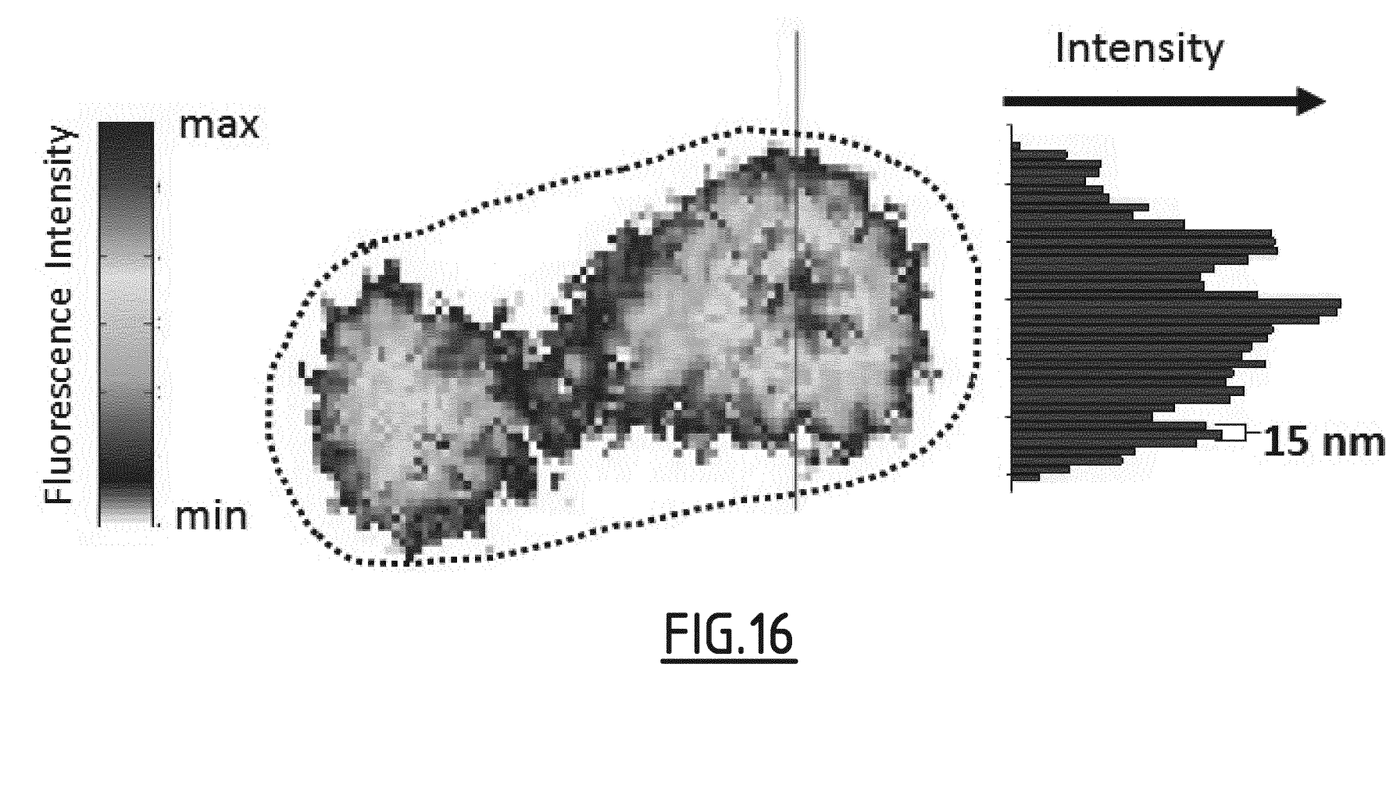
FIG. 16 is an illustrative figure of the fluorescence image an *E. coli* cell measured with a smaller displacement size of 15 nm, tagged with Sybre®Gold (Invitrogen) which stains nucleic acids.

FIG. 16 illustrates what images are able to be produced by the equipment described in this invention at a resolution superior to that of the above example. The image is of an *E. coli* cell stained to show total nucleic acid content.

More precisely, FIG. 16 is a.fluorescence image of an *Escherichia coli* MG1655Z1 cell stained with SYBR® gold (Invitrogen), for the detection of nucleic acids (DNA and RNA). The cell is undergoing cellular division as evidenced by the two main loci. The histogram represents the fluoresce intensity along the vertical line. The data in the image and histogram have not be interpolated and represent the output from the imaging method described herein. According to our invention, with a displacement distance of 15 nm in the X and Y panes; each pixel in the reconstructed image represents a unit size of 15 nm by 15 nm.

The resolution of the resulting XY(Z) image is dependent on the increment d of the sub-diffraction-limited mechanical displacement, as well as the pixel size of the 2D detector. For example a resolution superior to 40 nm, as defined by Donnert et al., Proc Natl Acad Sci USA. 2006, 103, 11440-11445, is obtainable with an excitation wavelength of 488 nm with the following hardware: optical microscope (21)—Nikon Ti; objective lens (4)—Nikon 100×CFI Plan Apochromat; displacement block (11)—Physik Instrumente; nanopositioning stage P-733 and digital camera (9)—Andor iXon Ultra 897.

Super-resolution according to this embodiment of the invention is basically achieved by conjugating a normal epi-fluorescence microscope (installed in a vibration-free environment) with a high-precision moving platform under the same experimental conditions as classical fluorescence microscopy, and with the proper software to reconstruct the images: it thus makes super-resolution accessible to a very large number of laboratories.

A particular embodiment has been described here above regarding fluorescence microscopy.

Of course, the invention is implementable for producing super-resolution images based on different types of microscopy: for example, transmission, scattering, or absorption microscopy.

In such case, the step ii) can be construed as a removal of the background intended to minimize the influence of out of focus emitters and/or scatterers.

In fluorescence microscopy the illumination light (excitation wavelength(s)) and captured light (emission wavelength(s)) are not the same, whereas in transmission, T, microscopy and absorption, A, microscopy they are identical. The ability to transmit the light is expressed in terms of an absorbance, A, which is normally written as $$A = -\ln\left(\frac{I}{I_o}\right)$$

where I and I0 are defined as the intensity (power per unit area) of the illumination light (termed incident radiation) and the captured light (termed transmitted radiation), respectively. In scattering microscopy, the illumination light is reflected (elastically or inelastically) by the object and as captured light registered by the 2D detector.

Thus the invention enables to obtain a image of a sample with an effective resolution superior to that of the Abbe diffraction limit, by means of sub-diffraction length displacements in two (x, y), or three (x,y,z), dimensions while the object of study is illuminated with a focused light source. During data acquisition, the sample of study is housed on a xy(z)-stage which moves relative to a fixed beam of collimated light. Alternatively, the xy(z)-stage may be fixed in the x and y axes while the laser beam scans the object of study, by means of adaptive optics such as resonant scanning mirrors.

The invention exploits the inhomogeneous distribution of light that is emitted from within a focused, diffraction-limited, spot of monochromatic irradiation.

The invention claimed is:

1. An imaging method for obtaining a super-resolution image of an object, based upon an optical microscope and a displacement block, the optical microscope being adapted for capturing an image of the object, said optical microscope comprising:
    a support plate for bearing the object,
    an illumination source adapted to produce an illumination beam for illuminating the object,
    an optical element for focusing the illumination beam on the support plate, the section of the object on the support plane currently illuminated by the focused illumination beam being called hereafter the target region, and
    a digital camera including a matrix of sensors for capturing an image of the target region, each sensor providing for a respective pixel value,
    the displacement block being adapted for displacing the support plate relative to the focused illumination beam and to the digital camera along at least two displacement axes among three axes x, y, z perpendicular to each other, wherein the axes x and y define the plane of the support plate, said at least two displacement axes defining two corresponding perpendicular image axes of the super-resolution image;
    said method comprising the following set of steps:
    capturing, by the digital camera, a first image of the target region currently illuminated by the focused illumination beam, the first image of the target region corresponding to a diffraction spot image of the target region;
    extracting, from the captured first image, a first block of pixel values provided by a sub-matrix of the matrix of sensors, the sub-matrix of the matrix of sensors being chosen so that the sub-matrix be located inside the diffraction spot image of the target region;
    storing said first bloc of pixel values as a first block of pixel values of the super-resolution image;
    displacing, by a sub-diffraction limited distance, the support plate by the displacement block along one of the displacement axis;
    capturing, by the digital camera, a second image of the target region currently illuminated by the focused illumination beam, the second image of the target region corresponding to the diffraction spot image of the target region;

extracting, from the captured second image, a second block of pixel values provided by said sub-matrix of the matrix of sensors;

storing said second bloc of pixel values as a second block of pixel values of the super-resolution image, said second block of pixel values being placed right next to said first block of pixel values in the super-resolution image along the image axis corresponding to said one displacement axis.

2. The imaging method according to claim 1, wherein the sub-matrix comprises only one sensor.

3. The imaging method according to claim 1, wherein a sensor of the matrix is selected as sensor of the sub-matrix in a preliminary step only if said sensor captures a part of the image of the focused illumination beam on the support plate.

4. The imaging method according to claim 3, wherein the sensor(s) of the matrix is/are selected as sensor(s) of the sub-matrix in a preliminary step as the one(s) among the sensors of the matrix capturing a part of the image of the focused illumination beam on the support plate wherein the image is in geometrical focus.

5. The imaging method according to claim 1, comprising a step of:

applying a background removal to the pixel values of the super-resolution image and/or including a step of cropping said pixel values that are outside at least one specified range of upper intensity values, in order to remove from the pixel values related to an individual fluorescing, transmitting, scattering or absorbing object the overlapping intensities of neighbouring fluorescing, transmitting, scattering or absorbing objects.

6. The imaging method according to claim 1, wherein the object includes at least one fluorescence, transmission, scattering or absorption source, and the illumination source is adapted to produce an illumination beam for generating fluorescence, transmission, scattering or absorption from the illuminated object, the image of the target region captured by the digital camera being an image of the fluorescence, transmission, scattering or absorption generated by the illuminated object, the obtained super-resolution image being a super-resolution fluorescence, transmission, scattering or absorption image.

7. An imaging system for obtaining an super-resolution image of an object, said imaging system including a controller, an optical microscope and a displacement block, said optical microscope including:

a support plate for bearing the object to be imaged, an illumination source adapted to produce an illumination beam for illuminating the object, an optical element for focusing the illumination beam on the support plate, the section of the object on the support plane currently illuminated by the focused illumination beam being called hereafter the target region, and a digital camera including a matrix of sensors for capturing an image of the target region, each sensor providing for a respective pixel value, the displacement block being adapted for displacing the support plate relative to the focused illumination beam and to the digital camera along at least two displacement axes among three axes x, y, z perpendicular to each other, wherein the axes x and y define the plane of the support plate, said at least two displacement axes defining two corresponding perpendicular image axes of the super-resolution image;

the controller being adapted for iterating the following operation's set of:

commanding the digital camera to capture a first image of the target region currently illuminated by the focused illumination beam, the first image of the target region corresponding to a diffraction spot image of the target region;

extracting, from the captured first image, a first block of pixel values provided by a sub-matrix of the matrix of sensors, the sub-matrix of the matrix of sensors being chosen so that the sub-matrix be located inside the diffraction spot image of the target region;

storing said first bloc of pixel values as a first block of pixel values of a super-resolution image of the object, commanding the displacement block to displace, by a sub-diffraction limited distance, the support plate along one of the displacement axis, commanding the digital camera to capture a second image of the target region currently illuminated by the focused illumination beam, extracting, from the captured second image, a second block of pixel values provided by said sub-matrix of the matrix of sensors, the second image of the target region corresponding to the diffraction spot image of the target region, and storing said second bloc of pixel values as a second block of pixel values of the super-resolution image, said second block of pixel values being placed right next to said first block of pixel values in the super-resolution image along the image axis corresponding to said one displacement axis.

8. The imaging system according to claim 7, wherein the sub-matrix comprises only one sensor.

9. The imaging system according to claim 7, wherein the controller is adapted for selecting a sensor of the matrix as sensor of the sub-matrix only if said sensor captures a part of the image of the focused illumination beam on the support plate.

10. The imaging system according to claim 9, wherein the controller is adapted for selecting sensor(s) of the matrix as sensor(s) of the sub-matrix in a preliminary step as the one(s) among the sensors of the matrix capturing a part of the image of the focused illumination beam on the support plate wherein the image is the most in focus.

11. The imaging system according to claim 7, wherein the controller is adapted for applying a background removal to the pixel values of the super-resolution image and/or for cropping said pixel values that are outside at least one specified range of upper intensity values, in order to remove from the pixel values related to an individual fluorescing, transmitting, scattering or absorbing object the overlapping intensities of neighbouring fluorescing, transmitting, scattering or absorbing objects.

12. The imaging system according to claim 7, adapted for imaging an object including at least one fluorescence, transmission, scattering or absorption source and for obtaining a super-resolution fluorescence, transmission, scattering or absorption image, wherein the illumination source is adapted to produce an illumination beam for generating fluorescence, transmission, scattering or absorption from the illuminated object, the image of the target region captured by the digital camera being an image of the fluorescence, transmission, scattering or absorption generated by the illuminated object.

* * * * *